(12) United States Patent
Chang

(10) Patent No.: US 7,654,723 B2
(45) Date of Patent: *Feb. 2, 2010

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 232 days.

This patent is subject to a terminal disclaimer.

(21) Appl. No.: 11/845,100

(22) Filed: Aug. 27, 2007

(65) Prior Publication Data

US 2008/0266874 A1  Oct. 30, 2008

(30) Foreign Application Priority Data

Apr. 27, 2007  (CN) .................. 2007 1 0200535

(51) Int. Cl.
*F21V 7/04* (2006.01)
(52) U.S. Cl. .................. 362/620; 362/330; 362/332; 362/626
(58) Field of Classification Search ......... 362/330–332, 362/615, 617, 620, 625, 626
See application file for complete search history.

(56) References Cited

U.S. PATENT DOCUMENTS

| | | | | |
|---|---|---|---|---|
| 4,053,208 A * | 10/1977 | Kato et al. | .................. | 359/460 |
| 5,839,823 A * | 11/1998 | Hou et al. | .................. | 362/327 |
| 6,709,143 B2 * | 3/2004 | Harada et al. | ............... | 362/558 |
| 6,752,505 B2 * | 6/2004 | Parker et al. | ................ | 362/627 |
| 6,925,243 B2 * | 8/2005 | Lin | ............................ | 385/146 |
| 7,160,016 B2 * | 1/2007 | Yu et al. | ..................... | 362/620 |
| 7,422,357 B1 * | 9/2008 | Chang | ........................ | 362/602 |
| 7,458,714 B2 * | 12/2008 | Chang | ........................ | 362/626 |
| 2007/0147089 A1 * | 6/2007 | Lin et al. | ..................... | 362/616 |
| 2007/0165394 A1 * | 7/2007 | Chang | ......................... | 362/97 |

* cited by examiner

*Primary Examiner*—Ali Alavi
(74) *Attorney, Agent, or Firm*—Frank R. Niranjan

(57) ABSTRACT

An exemplary optical plate includes at least one transparent plate unit. The transparent plate unit includes a first surface, a second surface, a plurality of conical frustum protrusions, a plurality of spherical protrusions and a lamp-receiving portion. The second surface is opposite to the first surface. The conical frustum protrusions are formed at the first surface. The spherical protrusions are formed at the second surface. The lamp-receiving portion is defined in at least one of the first surface and the second surface. A backlight module using the present optical plate is also provided.

20 Claims, 11 Drawing Sheets

OPTICAL PLATE AND BACKLIGHT MODULE USING THE SAME

CROSS-REFERENCE TO RELATED APPLICATIONS

This application is related to eleven copending U.S. patent applications, which are: application Ser. No. 11/835,425, Ser. No. 11/835,426, Ser. No. 11/835,427, Ser. No. 11/835,428, Ser. No. 11/835,429, Ser. No. 11/835,430, and Ser. No. 11/835,431, filed on Aug. 8, 2007; application Ser. No. 11/836,799, filed on Aug. 10, 2007; application Ser. No. 11/842,170, filed on Aug. 21, 2007; applicants Ser. No. 11/843,669, and Ser. No. 11/843,670, filed on Aug. 23, 2007, and all entitled "OPTICAL PLATE AND BACKLIGHT MODULE USING THE SAME"; In all these copending applications, the inventor is Shao-Han Chang. All of the copending applications have the same assignee as the present application. The disclosures of the above identified applications are incorporated herein by reference.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself illuminate light. Instead, the liquid crystal relies on light received from a light source in order for the liquid crystal to display data images. In the case of a typical liquid crystal display device, a backlight module powered by electricity supplies the needed light.

FIG. 11 represents a typical direct type backlight module 100. The backlight module 100 includes a housing 101, a light reflective plate 102, a light diffusion plate 103, a prism sheet 104, and a plurality of light emitting diode 105 (hereinafter called LED). The housing 101 includes a rectangular base 1011 and four sidewalls 1013 extending from a periphery of the base 1011. The base 1011 and the four sidewalls 1013 cooperatively define a chamber 107. Each LED 105 includes a base portion 1053 and a light-emitting portion 1051 disposed on the base portion 1053. The LEDs 105 are electrically connected to a printed circuit board 107, and the printed circuit board 107 is fixed to the base 1011 of the housing 101. The light reflective plate 102 is disposed on the LEDs 105 in the chamber 1017. The light reflective plate 102 defines a plurality of through holes (not labeled) that allows the light-emitting portions 1051 of the LED 105 to pass through and to emit light to be transmitted to the light diffusion plate 103. The light diffusion plate 103 and the prism sheet 104 are stacked in that order on the chamber 1017. Light emitted from the LEDs 105 is substantially reflected by the light reflective sheet 102 to enter the light diffusion plate 103, and diffused uniformly in the light diffusion plate 103, and finally surface light is output from the prism sheet 104.

Generally, a plurality of dark areas may occur because of the reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. However, the brightness of the backlight module 100 is still not uniform. One method of enhancing the uniformity of brightness of the backlight module 100 is to increase the space between the light diffusion plate 103 and the LEDs 105. This increase in space tends to eliminate potential dark areas. However, increasing the space between the diffusion plate 103 and the LEDs 105 will also increase the thickness of the backlight module and further the overall intensity of the output light rays is reduced.

What is needed, therefore, is a new optical plate and a backlight module using the optical plate that can overcome the above-mentioned shortcomings.

SUMMARY

An optical plate according to a preferred embodiment includes at least one transparent plate unit. The transparent plate unit includes a first surface, a second surface, a plurality of conical frustum protrusions, a plurality of spherical protrusions and a lamp-receiving portion. The second surface is opposite to the first surface. The conical frustum protrusions are formed at the first surface. The spherical protrusions are formed at the second surface. The lamp-receiving portion is defined in at least one of the first surface and the second surface.

A backlight module according to a preferred embodiment includes a housing, a side-lighting type point light source, an optical plate, and a light diffusion plate. The housing includes a base and a plurality of sidewalls extending around a periphery of the base, the base and the sidewalls cooperatively forming an opening. The point light source is disposed on the base, each point light source having a light-emitting portion. The same optical plate as described in the previous paragraph is employed in this embodiment. The light-emitting portion of the point light source is inserted in the lamp-receiving portion of the optical plate correspondingly. The light diffusion plate is disposed on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
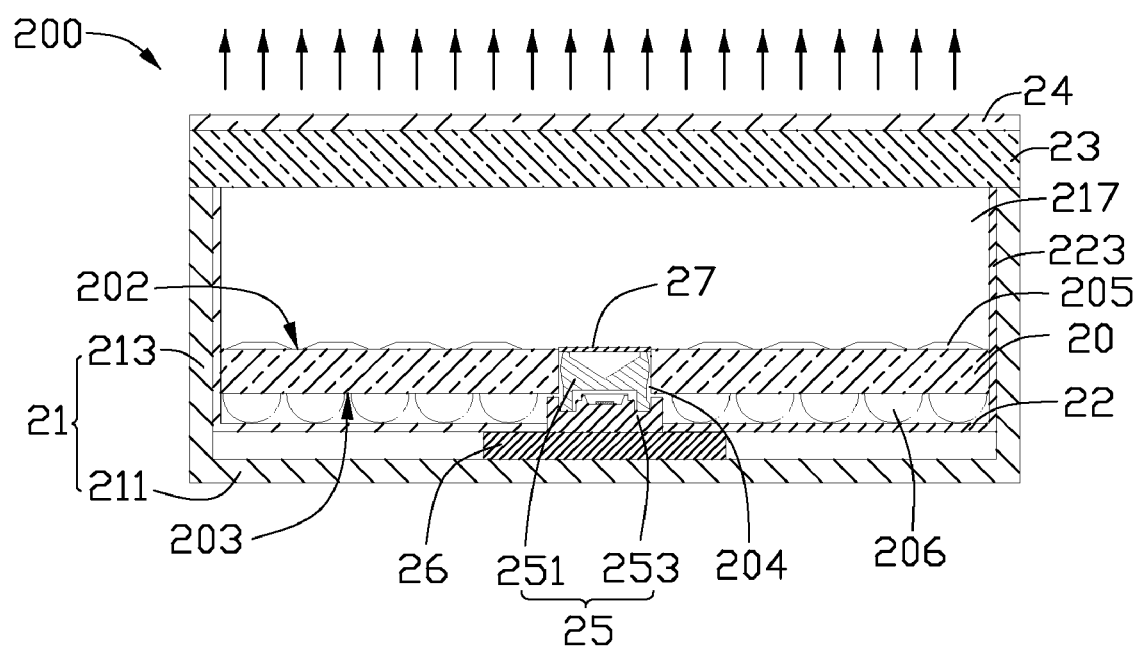
FIG. 1 is a side cross-sectional view of a backlight module using an optical plate according to a first preferred embodiment of the present invention.

Referring to FIG. 1, a backlight module 200 in accordance with a first preferred embodiment is shown. The backlight module 200 includes an optical plate 20, a housing 21, a light reflective plate 22, a light diffusion plate 23, a LED 25 and a reflective member 27. The housing 21 includes a rectangular base 211 and four sidewalls 213 extending around a periphery of the base 211. The base 211 and the sidewalls 213 cooperatively define an opening 217. The optical plate 20, the light reflective plate 22, the LED 25 and the reflective member 27 are received in the housing 21. The light diffusion plate 23 is disposed on the housing 21 over the opening 217.

Figure 2:
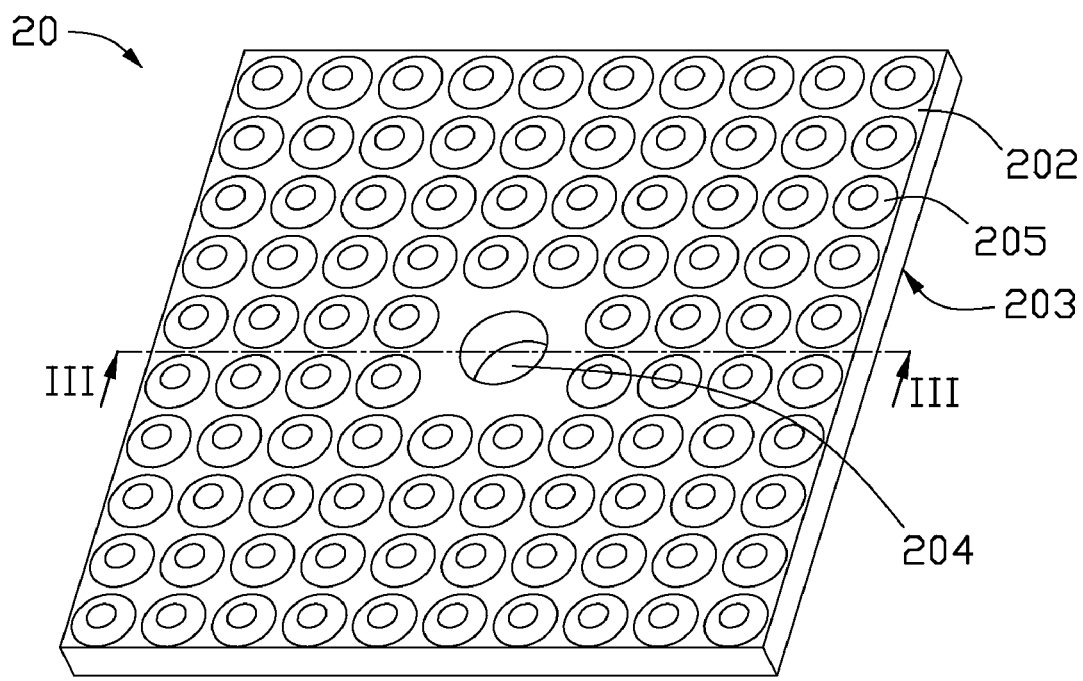
FIG. 2 is an isometric view of the optical plate of FIG. 1.
Figure 3:
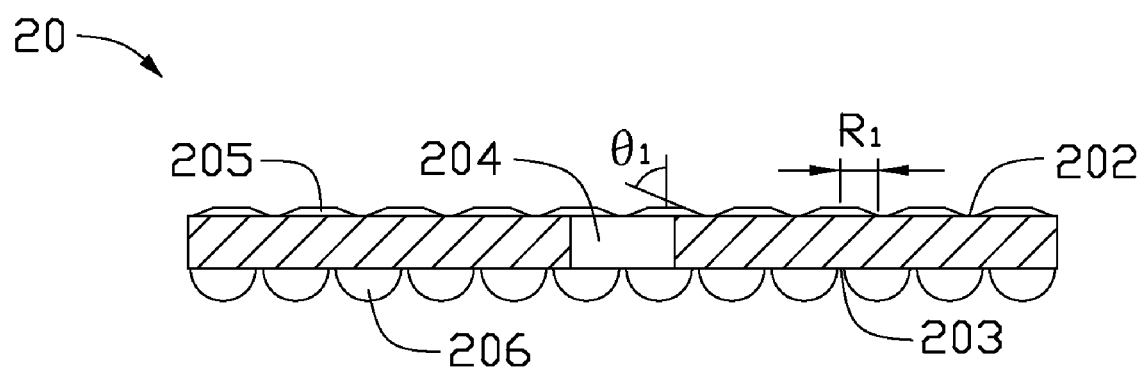
FIG. 3 is a cross-sectional view taken along line III-III of FIG. 2.

Referring to FIGS. 2 and 3, the optical plate 20 is a transparent square plate, which can be mounted into the housing 21. The optical plate 20 includes a light output surface 202, a bottom surface 203 opposite to the light output surface 202. A plurality of conical frustum protrusions 205 are formed on the light output surface 202. A plurality of spherical protrusions 206 are formed at the bottom surface 203. The optical plate 20 further includes a lamp-receiving portion 204 defined in a center of the bottom surface 203. In this embodiment, the lamp-receiving portion 204 is a through hole communicating between the light output surface 202 and the bottom surface 203. The optical plate 20 can be made of material selected from the group consisting of polycarbonate (PC), polymethyl methacrylate (PMMA), polystyrene (PS), copolymer of methylmethacrylate and styrene (MS), and any suitable combination thereof.

Figure 4:
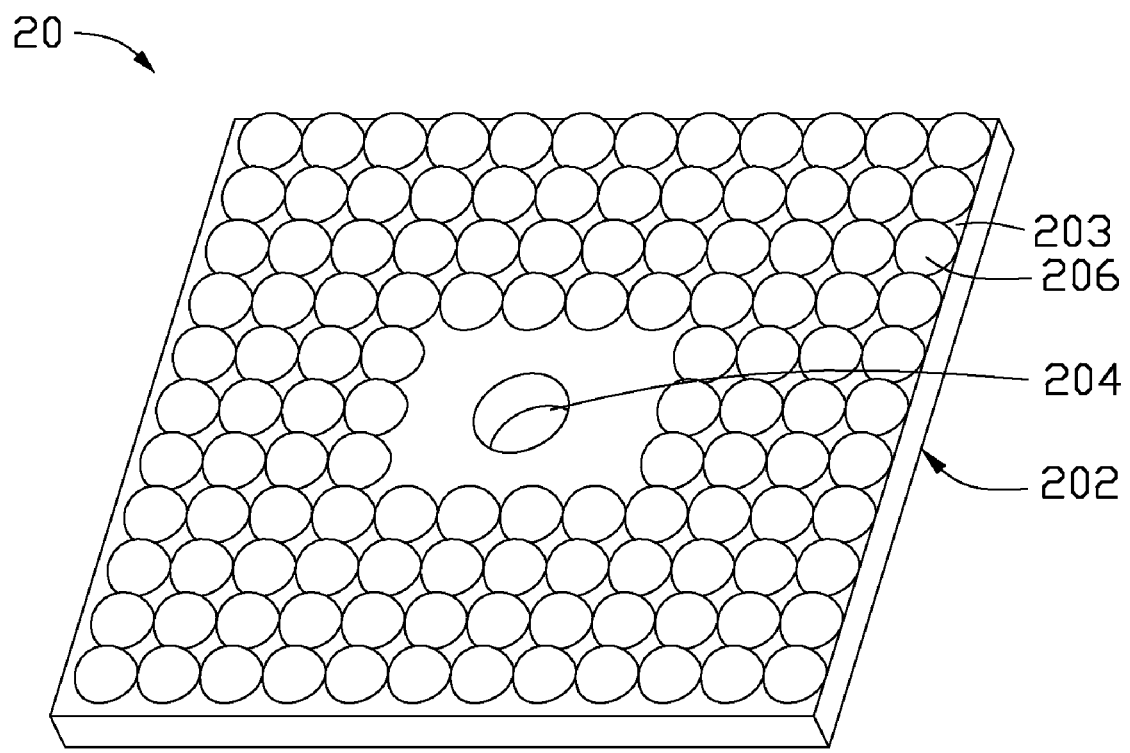
FIG. 4 is an isometric, inverted view of the optical plate of FIG. 2.

The conical frustum protrusions 205 are distributed on the light output surface 202 in a matrix manner except a part of the lamp-receiving portion 204. A maximum radius $R_1$ of each conical frustum protrusion 205 is configured to be larger than 0.01 millimeters, and less than about 2 millimeters. A height of each conical frustum protrusion is configured to be in a range from about 0.01 millimeters to about 3 millimeters. Referring to FIG. 3, an inclined angle $\theta_1$ of a conical surface of each conical frustum protrusion 205 with respect to an axis perpendicular to its base surface is larger than zero and equal to or smaller than 60 degrees. A pitch of adjacent conical frustum protrusions 205 is preferably in a range from about 0.025 millimeters to about 2 millimeters. Referring to FIG. 4, the spherical protrusions 206 are distributed on the bottom surface 203 in a matrix manner except for a substantially square area surrounding the lamp-receiving portion 204. In the illustrated embodiment, the spherical protrusion 206 is hemispherical protrusion. A height of the spherical protrusion 206 is equal to the radius of the spherical protrusion 206 that is in a range from about 0.01 millimeters to about 2 millimeters. A pitch of adjacent spherical protrusions 206 is preferably in a range from about 0.025 millimeters to about 2 millimeters.

Again referring to FIG. 1, in this embodiment, the LED 25 includes a base portion 253, a light-emitting portion 251 disposed on the base portion 253. The LED 25 is electrically connected to a printed circuit board 26 that is fixed to the base 211 of the housing 21. The light-emitting portion 251 of the LED 25 is inserted into the lamp-receiving portion 204 of the optical plate 20, and the light output surface 202 of the optical plate 20 faces the light diffusion plate 23. The light reflective plate 22 defines a through hole (not labeled). The light reflective plate 22 is disposed under the bottom surface 203 of the optical plate 20, the LED 25 and passes through the light reflective plate 22 via the through hole. The reflective member 27 is a reflective sheet disposed on the top of the light-emitting portion 251 and the reflective member 27 covers the top of the light-emitting portion 251 for decreasing the brightness of a portion of the backlight module 200 above the LED 25. In an alternative embodiment, the reflective member 27 can be a light reflective film formed on the top of the light-emitting portion 251.

In use, light emitted from the light-emitting portion 251 of the LED 25 enter the optical plate 20 via an inner surface of the lamp-receiving portion 204. A significant amount of light travels through the optical plate 20. Due to the inclination of the conical surfaces of the conical frustum protrusions 205, incident light that may have been internally reflected on a flat surface, is reflected by the conical surfaces of the conical frustum protrusions 205. As a result, a great amount of light is able to be outputted, from the light output surface 212, faster.

In addition, the conical frustum protrusions 205 can condense and collimate emitted light, thereby improving a light illumination brightness. Furthermore, because the LED 25 is positioned in the lamp-receiving portion 204, light is uniformly outputted from the light output surface 202 of the optical plate 20, except that the portion above the LED 25 has a relatively low illumination. Light from the optical plate 20 can be further substantially mixed in a chamber between the optical plate 20 and the light diffusion plate 23, and finally uniform surface light is outputted from the light diffusion plate 23. A distance from the LED 25 to the light diffusion plate 23 may be configured to be very short, with little or no potential risk of having dark areas on the portion of the backlight module 200 directly above the LED 25. Accordingly, the backlight module 200 can have a thin configuration while still providing good, uniform optical performance.

It should be pointed out that, the light reflective plate 22 can be omitted. In an alternative embodiment, a high reflectivity film can be deposited on inner surfaces of the base 211 and the sidewalls 213 of the housing 21. In other alternative embodiment, the housing 21 is made of metal materials, and has high reflectivity inner surfaces.

It is to be understood that, in order to improve brightness of the backlight module 200 within a specific viewing range, the backlight module 200 can further include a prism sheet 24 disposed on the light diffusion plate 23. In addition, in order to improve light energy utilization rate of the backlight module 200, the light reflective plate 22 can further include four reflective sidewalls 223 extending from a periphery thereof and contact with the sidewalls 213 of the housing 21 respectively.

Figure 5:
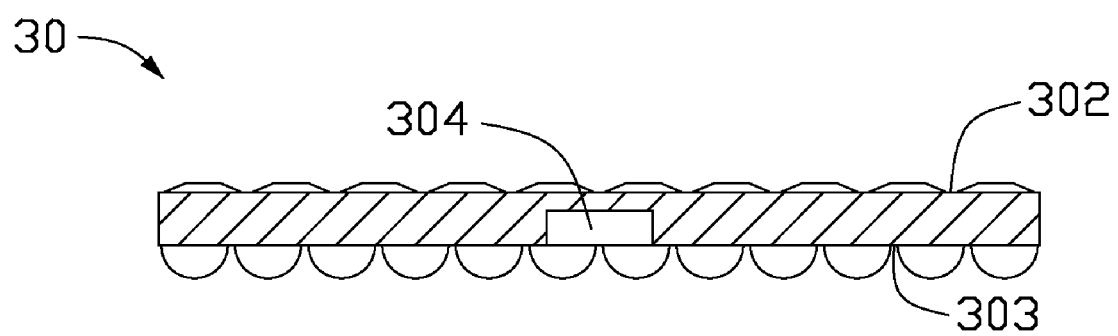
FIG. 5 is a side cross-sectional view of an optical plate according to a second preferred embodiment of the present invention.

Referring to FIG. 5, an optical plate 30 in accordance with a second preferred embodiment of the present invention is shown. The optical plate 30 is similar in principle to the optical plate 20 of the first embodiment, however the lamp-receiving portion 304 of the optical plate 30 is a blind hole. It should be pointed out that, a LED (not shown) can be mounted into the lamp-receiving portion 304 of the optical plate 30 to form a backlight module. Alternatively, a reflective member (not shown) can be also positioned on a part of the light output surface 302 above the lamp-receiving portion 304.

Figure 6:
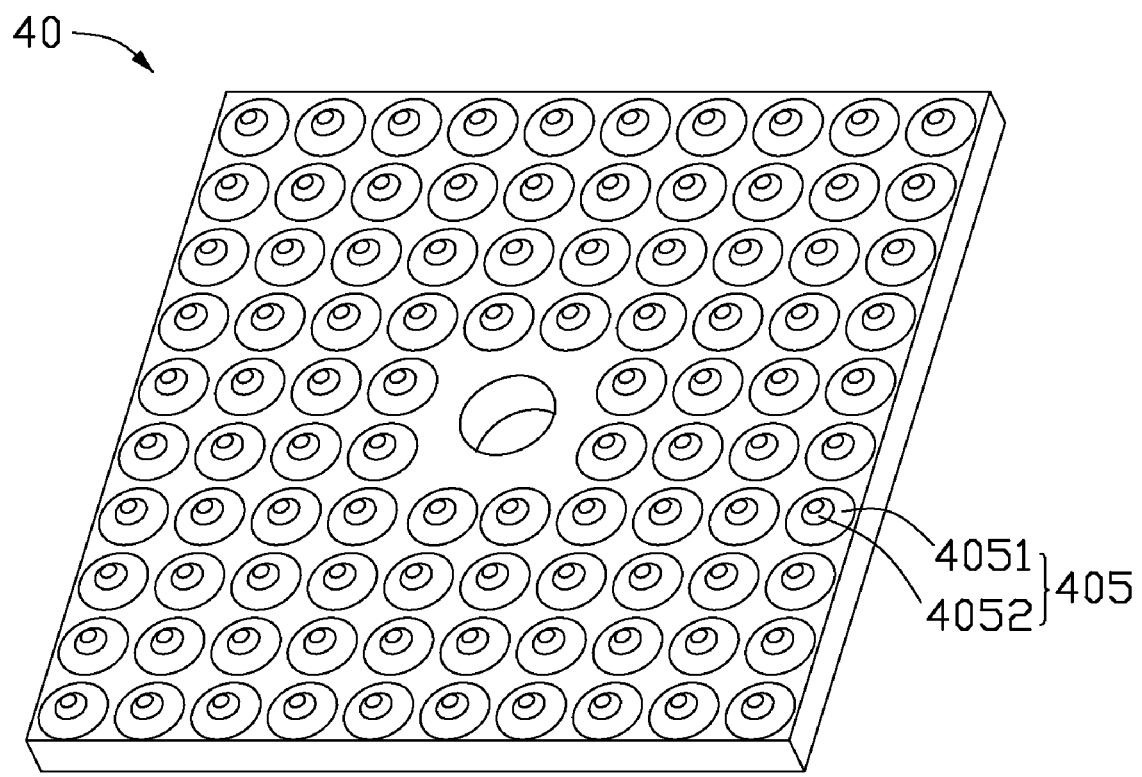
FIG. 6 is a an isometric view of an optical plate according to a third preferred embodiment of the present invention.

Referring to FIG. 6, an optical plate 40 in accordance with a third preferred embodiment is shown. The optical plate 40 is similar in principle to the optical plate 20 of the first embodiment (FIG. 2), however stacked conical frustum protrusions 405 are different from the conical frustum protrusions 205 of the optical plate 20. Each stacked conical frustum protrusion 405 is comprised of at least two conical frustum protrusions stacked together. In this embodiment, the stacked conical frustum protrusion 405 includes a first conical frustum protrusion and a second conical frustum protrusion, the second conical frustum protrusion disposed on top of the first conical frustum protrusion. In each stacked conical frustum protrusion 405, inclined angles of the conical frustums of the conical frustum protrusions 405 increases along a direction away from its base surface. Each of the inclined angles of the conical frustum protrusions 405 is larger than zero, and equal to or smaller than 60 degrees.

Figure 7:
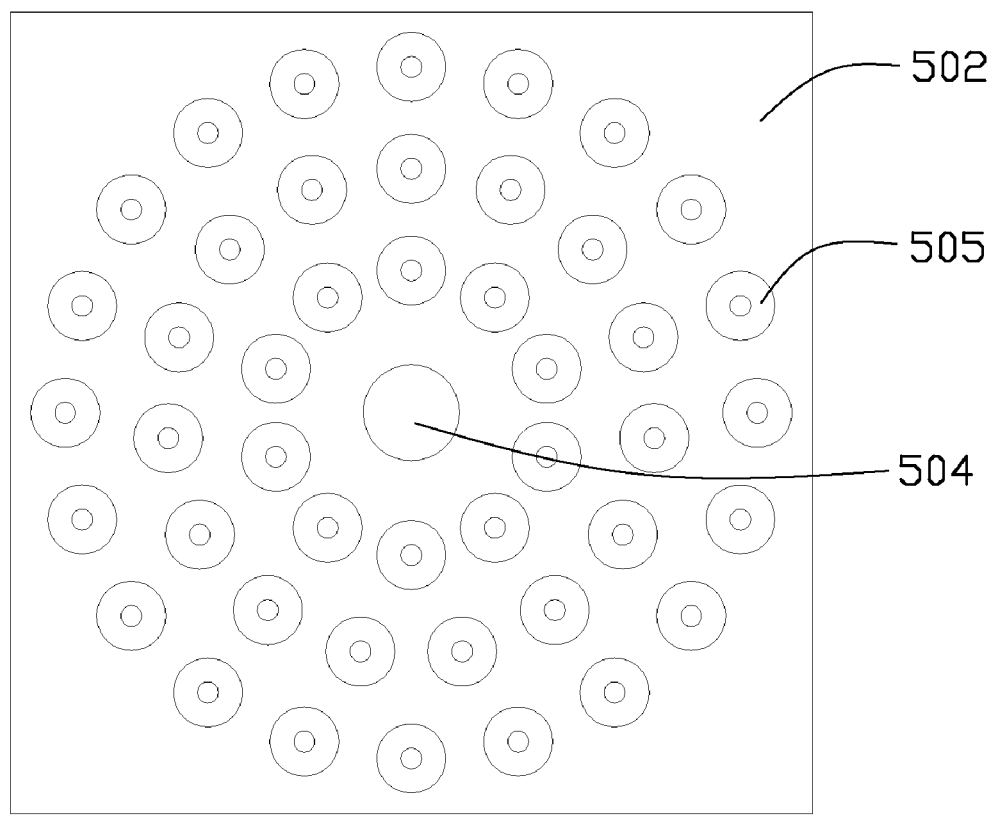
FIG. 7 is a top plan view of an optical plate according to a fourth preferred embodiment of the present invention.
Figure 8:
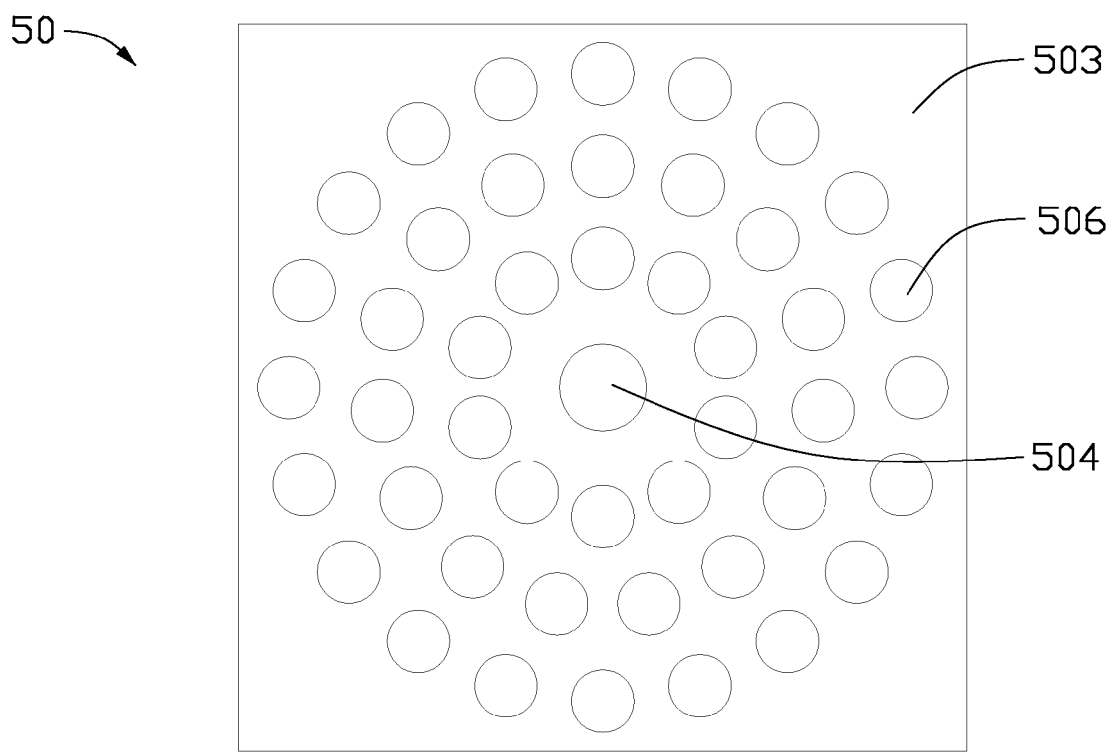
FIG. 8 is similar to FIG. 7, except that showing a bottom plan view of the optical plate.

Referring to FIGS. 7 and 8, an optical plate 50 in accordance with a fourth preferred embodiment is shown. The optical plate 50 is similar in principle to the optical plate 20 of the first embodiment (FIG. 2), however, conical frustum protrusions 505 and spherical protrusions 506 are both arranged separately along a plurality of imaginary circles that have a same center. The center of the imaginary circles is also the center of a lamp-receiving portion 504 of the optical plate 50.

Figure 9:
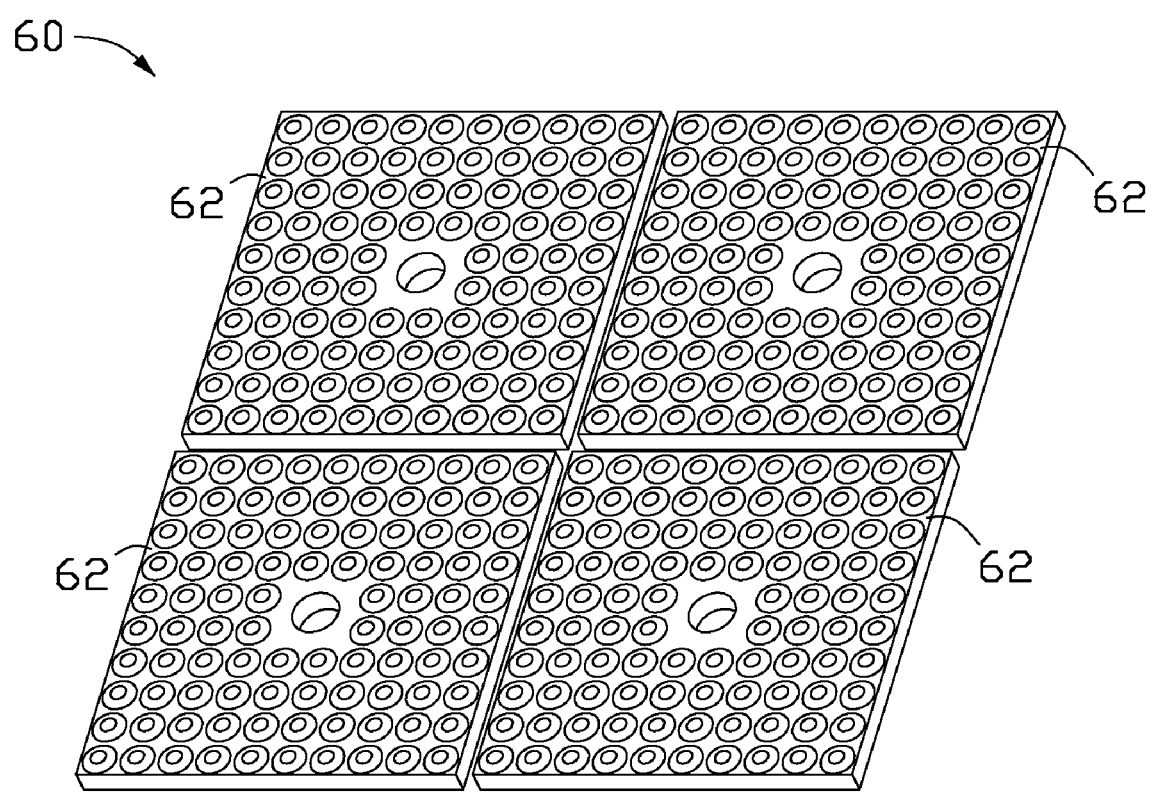
FIG. 9 is an exploded, isometric view of an optical plate according to a fifth preferred embodiment of the present invention.

Referring to FIG. 9, an optical plate 60 in accordance with a fifth preferred embodiment is shown. The optical plate 60 includes four transparent plate units 62. Each transparent plate unit 62 is the same as the optical plate 20 of the first embodiment. The four transparent plate units 62 are tightly arranged side by side to form the assembled optical plate 60. It is to be understood that four side-lighting type LEDs and the combined optical plate 60 can be mounted into a housing to form a larger size backlight module.

In a backlight module using the combined optical plates of the fifth embodiment, a plurality of red, green, and blue colored LEDs can be inserted into the lamp-receiving portions of the combined optical plates, such that a mixed white surface light can be obtained. It is to be understood that other kinds of point light source, such as field emission lamps and so on, can replace the LEDs 25 in above embodiments.

Figure 10:
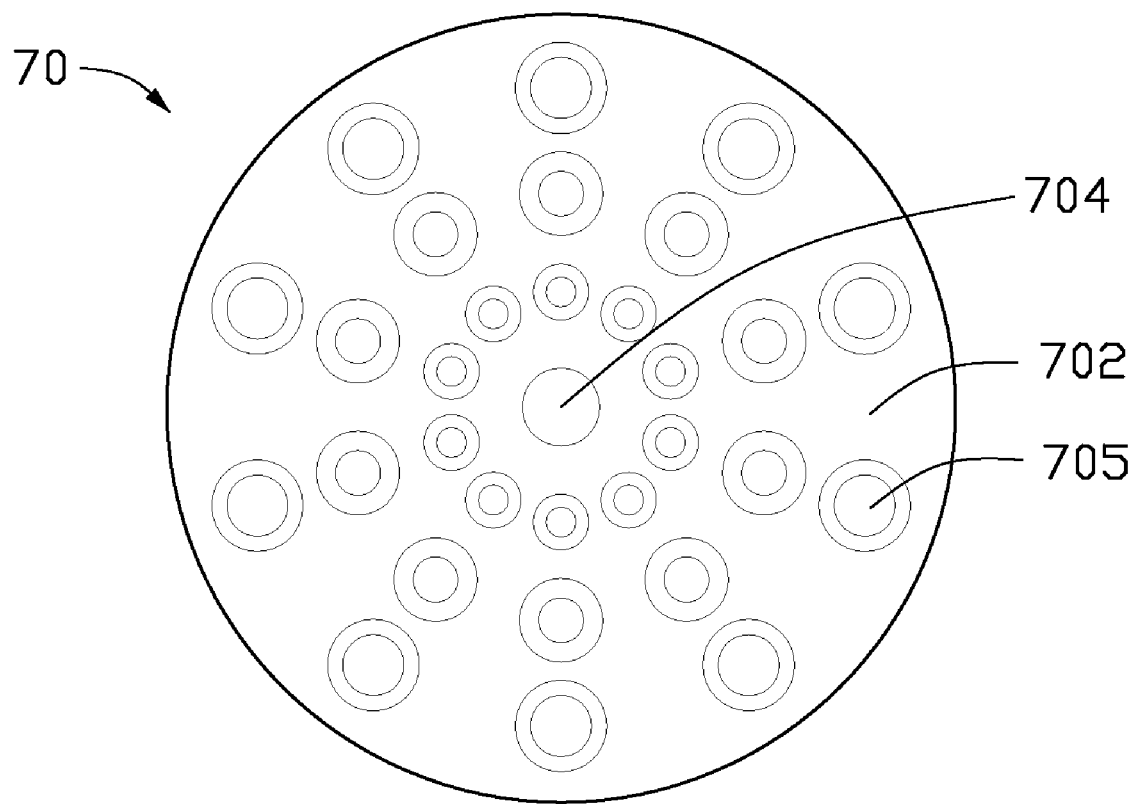
FIG. 10 is a top plan view of an optical plate according to a sixth preferred embodiment of the present invention.
Figure 11:
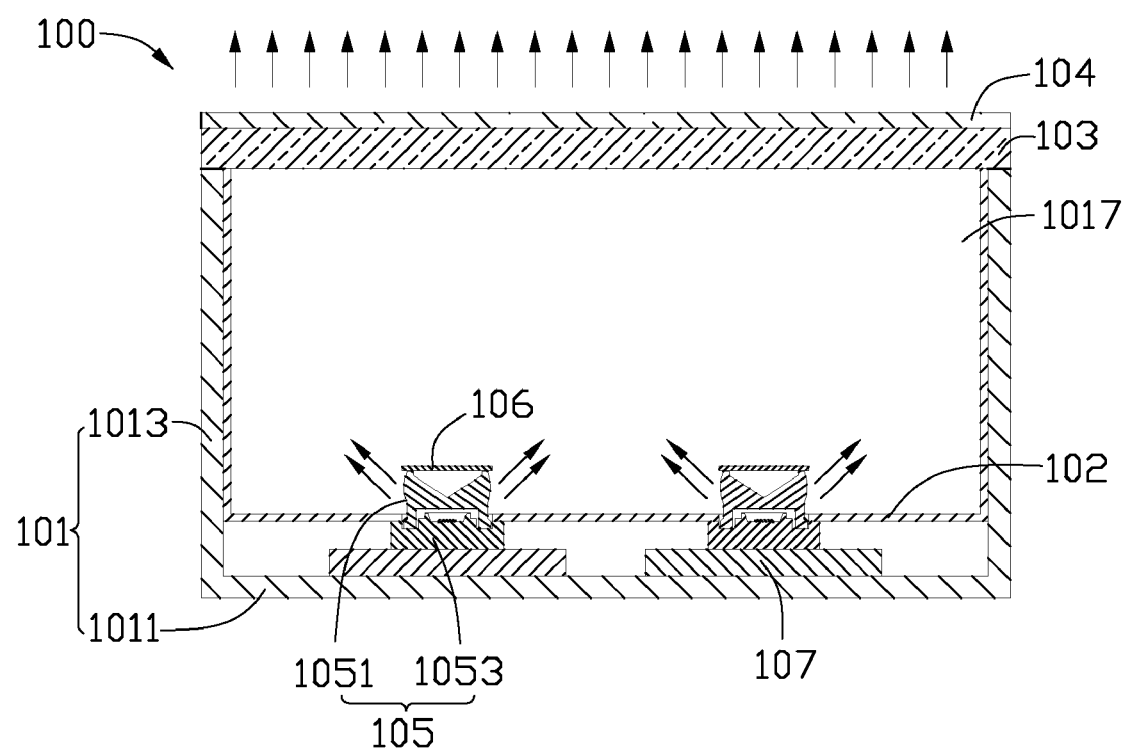
FIG. 11 is a side cross-sectional view of a conventional backlight module.

Referring to FIG. 10, an optical plate 70 in accordance with a sixth preferred embodiment is shown. The optical plate 70 is similar in principle to the optical plate 50 of the fourth embodiment. However, the optical plate 70 is a rectangular, and the conical frustum protrusions 702 are arranged radially from a lamp-receiving portion 704. The sizes of the conical frustum protrusions 702 increase as a distance of the conical frustum protrusions 702 from the lamp-receiving portion 605. This configuration of the optical plate 70 may have a relatively good uniformity of light output.

It should be noted that, in the backlight module 200, not only the optical plate 20 can be positioned in the housing 21 and the light output surface 202 faces the light diffusion plate 23, but also the optical plate 20 can be positioned in the housing 21 and the bottom surface 203 faces the light diffusion plate 23. That is, the conical frustum protrusions 205 are formed at a first surface of the optical plate 20, and the spherical protrusions 206 are formed at a second surface of the optical plate 20. The first surface is selected from one of the light output surface 202 and the bottom surface 203, and the second surface is selected from the other one of the light output surface 202 and the bottom surface 203.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a first surface;
   a second surface opposite to the first surface;
   a plurality of conical frustum protrusions formed at the first surface;
   a plurality of spherical protrusions formed at the second surface; and
   at least a lamp-receiving portion defined in at least one of the first surface and the second surface.

2. The optical plate according to claim 1, wherein inclined angles defined by conical surfaces of the conical frustum protrusions with respect to its base surface increases along a direction away from its base surface.

3. The optical plate according to claim 2, wherein an inclined angle defined by conical surface of each microstructure with respect to an axis perpendicular to its base surface is larger than zero, and equal to or smaller than 60 degrees.

4. The optical plate according to claim 1, wherein a radius of a base of each conical frustum protrusion is configured to be in a range from about 0.01 millimeters to about 2 millimeters.

5. The optical plate according to claim 1, wherein a height of each conical frustum protrusion is configured to be in a range from about 0.01 millimeters to about 3 millimeters.

6. The optical plate according to claim 1, wherein the sizes of the conical frustum protrusions increase as a distance of the conical frustum protrusions from the lamp-receiving portion.

7. The optical plate according to claim 1, wherein a height of the spherical protrusions is equal to the radius of the spherical protrusion that is in a range from about 0.01 millimeters to about 2 millimeters.

8. The optical plate according to claim 1, wherein a pitch of two adjacent spherical protrusions is preferably in a range from about 0.025 millimeters to about 2 millimeters 9. The optical plate according to claim 1, wherein the lamp-receiving portion is selected from one of blind hole and through hole communicating with the first surface and the second surface.

10. The optical plate according to claim 1, wherein the optical plate includes a plurality of the transparent plate units, the transparent plate units being tightly combined with each other.

11. A backlight module comprising:
   a housing having a base and a plurality of sidewalls extending from a periphery of the base, the base and the sidewalls cooperatively forming an opening;
   at least one side-lighting type point light source disposed on the base, each point light source having a light-emitting portion;
   at least one reflective member is positioned above the top of the light-emitting portion;
   an optical plate positioned in the housing, the optical plate including at least one transparent plate unit having:
   a first surface;
   a second surface opposite to the first surface;
   a plurality of conical frustum protrusions formed at the first surface;
   a plurality of spherical protrusions formed at the second surface; and at least a lamp-receiving portion defined in at least one of the first surface and the second surface, wherein the light-emitting portion of the at least one point light source is inserted in the lamp-receiving portion correspondingly; and
   a light diffusion plate disposed on the housing over the opening.

12. The backlight module according to claim 11, further comprising a light reflective plate defining a through hole therein, the light reflective plate being disposed underneath the bottom surface of the optical plate, and the point light source passing through the light reflective plate via the through hole.

13. The backlight module according to claim 11, wherein the light reflective plate further comprises a plurality of reflective sidewalls extending from a periphery thereof and contact with the sidewalls of the housing.

14. The backlight module according to claim 11, wherein the housing is made of metal materials, and has high reflectivity inner surfaces.

15. The backlight module according to claim 11, further comprising a high reflectivity film deposited on inner surfaces of the base and the sidewalls of the housing.

16. The backlight module according to claim 11, further comprising a prism sheet disposed on the light diffusion plate.

17. The backlight module according to claim 11, wherein inclined angles defined by side surfaces the conical frustum protrusions with respect to an axis perpendicular to its base surface increases along a direction away from its base surface.

18. The backlight module according to claim 11, wherein the sizes of the conical frustum protrusions increase as a distance of the conical frustum protrusions from the lamp-receiving portion.

19. The backlight module according to claim 11, wherein the lamp-receiving portion is selected from one of blind hole and through hole communicating with the first surface and the second surface.

20. The backlight module according to claim 11, wherein the optical plate includes a plurality of the transparent plate units, the transparent plate units being combined with each other.

* * * * *